US 6,473,793 B1

(12) United States Patent
Dillon et al.

(10) Patent No.: US 6,473,793 B1
(45) Date of Patent: Oct. 29, 2002

(54) METHOD AND APPARATUS FOR SELECTIVELY ALLOCATING AND ENFORCING BANDWIDTH USAGE REQUIREMENTS ON NETWORK USERS

(75) Inventors: Douglas M. Dillon, Gaithersburg, MD (US); Vivek Gupta, Gaithersburg, MD (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/233,343

(22) Filed: Jan. 19, 1999

Related U.S. Application Data

(60) Continuation-in-part of application No. 08/804,314, filed on Feb. 22, 1997, now Pat. No. 5,995,726, which is a division of application No. 08/257,670, filed on Jun. 8, 1994, now abandoned.
(60) Provisional application No. 60/106,933, filed on Nov. 3, 1998.

(51) Int. Cl.[7] .................................................. G06F 15/16
(52) U.S. Cl. ........................ 709/223; 370/235; 370/352; 370/401
(58) Field of Search ................................. 370/230, 235, 370/412, 468, 352, 401; 379/243; 709/223, 231, 232, 242; 725/95, 96, 109, 110

(56) References Cited

U.S. PATENT DOCUMENTS

| 5,534,913 A | | 7/1996 | Majeti et al. ................ 725/114 |
| 5,659,350 A | | 8/1997 | Hendricks et al. .......... 725/116 |
| 5,764,641 A | * | 6/1998 | Lin ............................ 370/412 |

(List continued on next page.)

FOREIGN PATENT DOCUMENTS

| JP | 55-120249 | 9/1980 |
| JP | 56-2765 | 1/1981 |
| JP | 59-135948 | 8/1984 |

(List continued on next page.)

OTHER PUBLICATIONS

"NetGuard Unveils NetGuardian 2.0 for Win Nt, OS/2 Users Jan. 6, 1997", Dennis, Sylvia, Newsbytes, Jan. 6, 1997.*
"Guardian offers a sophisticated, PC–based firewall", Info-World, Jul. 29, 1996.*
"NetGuard ships Guardian version 2.0; Enhanced Firewall product provides unique real time Internet management functionality and customizable report information", Business Wire, Oct. 16, 1996.*
Patent Abstracts of Japan, Abstract for JP 62–189823, Aug. 19, 1987.
Patent Asbtracts of Japan, Abstract for JP 5–252165, Sep. 28, 1993.

(List continued on next page.)

*Primary Examiner*—N. Le
*Assistant Examiner*—Walter Benson
(74) *Attorney, Agent, or Firm*—John T. Whelan; Michael W. Sales

(57) ABSTRACT

A hybrid gateway includes functionality that allows bandwidth on a network (such as a satellite link) to be dynamically allocated and enforced. The hybrid gateway compares the thresholds defined for a requesting terminal's level of service and its measured running average data throughput to determine if the requesting terminal's bandwidth should be reduced (throttled). The hybrid gateway intercepts requests made by the requesting terminals and, if necessary, reduces the advertized window size of requests made by the requesting terminal, thereby reducing the transmission speed of the link and therefore the bandwidth of the link.

15 Claims, 9 Drawing Sheets

U.S. PATENT DOCUMENTS

| | | | | | |
|---|---|---|---|---|---|
| 5,799,002 A | * | 8/1998 | Kirshnan | .................... | 370/234 |
| 5,953,506 A | * | 9/1999 | Kalra et al. | ................. | 709/231 |
| 6,016,388 A | * | 1/2000 | Dillon | ........................ | 709/242 |
| 6,038,216 A | | 3/2000 | Packer | ....................... | 370/231 |
| 6,078,564 A | * | 6/2000 | Lakshman et al. | .......... | 370/235 |
| 6,078,953 A | * | 6/2000 | Vaid et al. | .................. | 709/223 |
| 6,085,241 A | * | 7/2000 | Otis | .......................... | 709/223 |
| 6,125,177 A | * | 9/2000 | Whittake | .................... | 379/243 |
| 6,137,777 A | * | 10/2000 | Vaid et al. | .................. | 370/230 |
| 6,154,776 A | * | 11/2000 | Martin | ....................... | 709/226 |
| 6,160,797 A | * | 12/2000 | Robert, III et al. | ......... | 370/316 |
| 6,222,856 B1 | * | 4/2001 | Krishnan et al. | ........... | 370/468 |
| 6,249,530 B1 | * | 6/2001 | Blanco et al. | .............. | 370/468 |
| 6,292,465 B1 | * | 9/2001 | Vaid et al. | .................. | 370/230 |
| 6,411,616 B1 | | 6/2002 | Donahue et al. | ............ | 370/352 |

FOREIGN PATENT DOCUMENTS

| | | |
|---|---|---|
| JP | 60-167533 | 8/1985 |
| JP | 61-70823 | 4/1986 |
| JP | 61-310745 | 9/1986 |
| JP | 62-189823 | 8/1987 |
| JP | 63-107254 | 5/1988 |
| JP | 63-194426 | 8/1988 |
| JP | 4-14811 | 3/1992 |
| JP | 4-306934 | 10/1992 |
| JP | 5-157565 | 7/1993 |
| JP | 5-252085 | 9/1993 |
| JP | 5-252087 | 9/1993 |
| JP | 5-252165 | 9/1993 |
| JP | 6-252896 | 9/1994 |
| JP | 9-508228 | 6/1997 |
| WO | WO 98/20511 | 5/1998 |
| WO | WO 98/26510 | 6/1998 |

OTHER PUBLICATIONS

Partial Translation of JP 4–14811, Mar. 16, 1992.

Patent Abstracts of Japan, Abstract of JP–A–61–70823, Apr. 11, 1986.

"Fall Internet World '96 Exhibit Previews—Part Three of Five", *Business Wire*, Dec. 3, 1996.

Partial Translation and Abstract of JP–A–63–107254.

* cited by examiner

| LLC HEADER 1030 | SATELLITE HEADER 1020 | IP DATAGRAM ( PAYLOAD ) 1010 |
|---|---|---|
| DELIVERS PACKET TO SATELLITE GATEWAY STRIPPED OFF IN SATELLITE GATEWAY | USED TO ID CORRECT RECEIVER TERMINAL STRIPPED OFF IN BIC DRIVER IN USER TERMINAL | DESTINED FOR TCP/IP PACKAGE IN USER TERMINAL |

TCP PACKET

METHOD AND APPARATUS FOR SELECTIVELY ALLOCATING AND ENFORCING BANDWIDTH USAGE REQUIREMENTS ON NETWORK USERS

RELATED APPLICATIONS

This application is a continuation-in-part of U.S. application Ser. No. 08/804,314, and now U.S. Pat. No. 5,995,726, filed Feb. 22, 1997, which is a divisional of U.S. application Ser. No. 08/257,670, filed Jun. 8, 1994 and now abandoned. This application claims priority from provisional application serial No. 60/106,933 filed Nov. 3, 1998.

BACKGROUND OF THE INVENTION (a) Field of the Invention

This application relates to computer networks and, more specifically, to a method and apparatus for selectively allocating and enforcing bandwidth usage requirements on network users.

(b) Description of Related Art

The Internet is an example of a TCP/IP network. The Internet has over 10 million users. Conventionally, access to the Internet is achieved using a slow, inexpensive method, such as a terrestrial dial-up modem using a protocol such as SLIP (Serial Line IP), PPP, or by using a fast, more expensive method, such as a switched 56 Kbps, frame relay, ISDN (Integrated Services Digital Network), or T1 line.

Users generally want to receive (download) large amounts of data from networks such as the Internet. Thus, it is desirable to have a one-way link that is used only for downloading information from the network. A typical user will receive much more data from the network than he sends.

Based on this need, fast download systems such as DirecPC® have been developed. These systems provide a one-way link capable of carrying large amounts of data very quickly, while using a slower one-way link to send data into the network.

Today, many users have access to high speed network links, such as satellite links. High speed network links provide users with a large amount of bandwidth for downloading information. Presently, Internet service providers (ISPs) do not have a way to effectively allocate and enforce available bandwidth between their customers. Bandwidth enforcement and allocation systems would allow ISPs to offer service plans based on a variety of user parameters such as running-average throughput and peak throughput. A user's available bandwidth could be reduced or "throttled" if, for example, the user's running-average throughput exceeded a defined threshold for the user's service plan. The concept of "throttling," as used herein, may be used by Hughes Network Systems in connection with its DirecPC® product and service to ensure fair access to the appropriate level of system resources contracted for each subscriber. System resources may include available bandwith, peak or average data throughput or system response time. Throttling could also be done based on the number of TCP connections a user has, the type of connections or the type of data being transferred. A particular user could be exempt from throttling based on that user's historic usage. A bandwidth enforcement scheme would ideally manage the user's bandwidth without dropping any data packets sent to the user and would not affect time-sensitive applications, which are not bandwidth-intensive, such as Telnet. The enforcement scheme would also detect any abuse of the data transfer network and take appropriate action as needed. Data flow control and communication redirection based on communication traffic would also be carried out by the enforcement scheme.

SUMMARY OF THE INVENTION

The present invention may be embodied in a system for retrieving data from a source computer coupled to a TCP/IP network. The system includes a hybrid gateway coupled to the network and a plurality of requesting terminals coupled to the network, the requesting terminals receive data from the source computer at variable rates controlled by the hybrid gateway. One of the requesting terminals makes a request of the source computer specifying a first data rate, the hybrid gateway intercepts the request and may change the first data rate to a second data rate, the hybrid gateway forwards the request to the source computer, and the source computer answers the request via a communication link, including the hybrid gateway, to the requesting terminal.

In some embodiments the hybrid gateway further performs the function of measuring a running average data throughput for each of the plurality of requesting terminals. However, the hybrid gateway will not change the first data rate to a second data rate if the requesting terminal is in an exempt mode. The requesting terminal will be in the exempt mode if the requesting terminal has low historic usage.

In some embodiments the running average data throughput may be measured using the leaky bucket approach.

In some embodiments the hybrid gateway may change the first data rate to a second data rate based on a level of service subscribed to by each of the requesting terminals. The level of service corresponds to a threshold rate of data transferred to each of the requesting terminals. Accordingly, the gateway changes the first data rate to the second data rate when measured data throughput exceeds the threshold rate of data transferred to each of the requesting terminals.

In certain embodiments the hybrid gateway may change the first data rate to a second data rate if the hybrid gateway detects system abuse for the particular service plan subscribed to by a requesting terminal. In these embodiments the change in data rates is effected by changing the TCP window size advertized to the source computer.

In other embodiments the hybrid gateway may change the first data rate to a second data rate based on a number of TCP connections made by each of the requesting terminals. The hybrid gateway uses the amount of unacknowledged TCP data, in the recent past, as a mechanism to detect response-time sensitive and bandwidth-intensive TCP applications. Additionally, the hybrid gateway may prioritize the data for transmission based on the type of connection made by each of the requesting terminals.

In alternate embodiments the hybrid gateway may change the first data rate to a second data rate based on the type of connection made by each of the requesting terminals. Alternatively, the hybrid gateway may change the first data rate to a second data rate under high load conditions. Such high load condition may be detected by measuring the latency of data packets in the transmit queue. Additionally, the data rate may be changed only for bandwidth-intensive TCP applications without affecting response-time sensitive applications.

In other embodiments the hybrid gateway may change the first data rate to a second data rate when available capacity on the transmit link decreases. Wherein the decrease in capacity is detected by measuring the latency of data packets in the transmit queue. Additionally, the data rate may be changed only for bandwidth-intensive TCP applications without affecting response-time sensitive applications.

In some embodiments the hybrid gateway contains a mechanism to detect the type of data requested by each of the requesting terminals and may change the first data rate to a second data rated based on the data type requested by each of the requesting terminals.

In certain embodiments the communication link includes a high speed data path such as a satellite link. Additionally, the requesting terminals may be personal computers and the network may be the Internet.

The present invention may also be embodied in a method for controlling the rate at which data is received from a source computer at a requesting terminal via a communication link. The method includes the steps of receiving a request for data from the requesting terminal, determining the type of data being requested by the requesting terminal, determining the number of TCP connections opened by the requesting terminal and determining the level of load in the system. The method further includes the steps of determining a level of service for the requesting terminal, measuring running average data throughput for the requesting terminal, comparing the thresholds defined for the level of service with the measure of the running average data throughput, and regulating the rate at which data is received at the requesting terminal from the source computer via the communication link based on the comparison.

In some embodiments, the method may include the step of determining whether the requesting terminal is in an exempt mode. Wherein the step of determining whether the requesting terminal is in an exempt mode includes analyzing the historic usage of the requesting terminal.

In any of the foregoing embodiments the communication link may be a high speed data path such as a satellite link.

In some embodiments the step of regulating the rate at which data is received at the requesting terminal is based on a level of service subscribed to by the requesting terminal. Wherein, the level of service corresponds to a threshold rate of data transferred to the requesting terminal and the rate at which data is received at the requesting terminal is reduced when measured running average data throughput exceeds the threshold rate defined for the level of service.

In some embodiments the data rate may be further reduced corresponding to the number of open TCP connections. Wherein, the rate at which data is received at the requesting terminal is reduced by a hybrid gateway by reducing the advertized TCP window size. Additionally, the data rate may be further reduced corresponding to the number of open TCP connections.

In some of the foregoing embodiments, the step of determining the type of data being requested includes examining the packet header and calculating the amount of unacknowledged data in the TCP connection queue. Additionally, the step of regulating the data rate further includes examining the type of data being requested by the requesting terminal and reducing data rate only for bandwidth-intensive applications. Furthermore, the step of regulating the data rate includes a data rate reduction depending on the amount of load and available capacity in the communication link to the requesting terminals.

In any of the foregoing embodiments, the requesting terminals may be personal computers and the communication link may be the Internet.

In some of the foregoing embodiments, the step of determining the level of service includes examining an address of the requesting terminal and the step of regulating the data rate includes changing an advertized window size.

In another embodiment the present invention may be a hybrid gateway coupled to a network wherein a source computer and a plurality of requesting terminals are also coupled to the network. In this embodiment, the hybrid gateway includes means for determining the type of data being transferred to each of the requesting terminals, means for determining the number of TCP connections opened by each of the requesting terminals, means for determining the level of load and the available capacity in the system, and means for monitoring the rate at which data is transferred to each of the requesting terminals. The hybrid gateway also includes means for determining a level of service subscribed to by each of the requesting terminals, means for comparing the rate at which data is transferred to each of the plurality of requesting terminals and the thresholds based on the level of service subscribed to by each of the requesting terminals, and means for controlling the rate at which data is transferred to each of the requesting terminals based on the comparison.

The hybrid gateway may also include means for detecting whether a particular requesting terminal is in an exempt mode, means for receiving a request from each of the requesting terminals, and a communication link to each of the requesting terminals. The communication link may include a high speed data path such as a satellite link. Alternatively, the communication link may be the Internet.

The monitoring means in the hybrid gateway may include measuring running average data throughput for each of the plurality of the requesting terminals.

The means for controlling the rate at which data is transferred to each of the requesting terminals based on the comparison may change a first data rate to a second data rate based on a level of service subscribed to by each of the requesting terminals.

In some embodiments the level of service corresponds to a threshold rate of data transferred to each of the requesting terminals.

In other embodiments the hybrid gateway changes the first data rate to the second data rate when measured running average data throughput exceeds the threshold rate of data transferred to each of the requesting terminals. The first data rate is changed to the second data rate by reducing an advertized window size specified by the hybrid gateway.

Alternatively, the hybrid gateway further reduces the data rate corresponding to the number of TCP connections opened by the requesting terminal and does not reduce the data rate for response-time sensitive applications. The hybrid gateway may further reduce the data rate based on the amount of load and available capacity in the system.

In any of the foregoing embodiments the requesting terminals may be personal computers and the network may be the Internet.

In some of the forgoing embodiments the means for obtaining the level of service subscribed to by the requesting terminals includes examining a request sent to the hybrid gateway from the requesting terminals.

In another embodiment the present invention may be a method for controlling the rate at which data is transferred from a source computer to a requesting terminal. The method may include the steps of determining the type of data being requested by the requesting terminal, determining the number of TCP connections opened by the requesting terminal, and determining the level of load in the system. The method may further include monitoring the rate at which data is transferred to each of the requesting terminals, determining a level of service subscribed to by each of the requesting terminals, comparing the rate at which data is transferred to each of the plurality of requesting terminals and the level of service subscribed to by each of the requesting terminals, and controlling the rate at which data is transferred to each of the requesting terminals based on the comparison.

The method may further include the steps of determining whether any of the requesting terminals are in an exempt mode, receiving a request from each of the requesting terminals and transferring data to each requesting terminal. Wherein, the step of transferring comprises the use of a high speed data path such as a satellite. Additionally, the step of transferring may include the use of the Internet.

In some embodiments, the step of monitoring includes measuring running average data throughput for each requesting terminal and the step of controlling the rate at which data is transferred to each of the requesting terminals based on the comparison may change a first data rate to a second data rate based on a level of service subscribed to by each of the requesting terminals.

In accordance with some embodiments the data rate is further reduced corresponding to the number of TCP connections opened by the requesting terminal. Wherein, the level of service corresponds to a threshold rate of data transferred to each of the requesting terminals.

In some embodiments, the gateway changes the first data rate to the second data rate when measured running average data throughput exceeds the threshold rate of data transferred to each of the requesting terminals. Wherein, the first data rate is changed to the second data rate by reducing an advertized window size specified by the hybrid gateway. The step of determining the type of data being requested may include examining the packet header and calculating the amount of unacknowledged data in the TCP connection queue.

In certain embodiments, the step of regulating the data rate further includes examining the type of data being requested by the requesting terminal and reducing data rate only for bandwidth-intensive applications. Additionally, the step of regulating the data rate includes a data rate reduction depending on the amount of load and available capacity in the communication link to the requesting terminals.

In any of the foregoing embodiments, the requesting terminals may be personal computers and the network may be the Internet.

In some embodiments, the step of obtaining the level of service subscribed to by the requesting terminals includes examining a request sent to the hybrid gateway from the requesting terminals.

The invention itself, together with further objects and attendant advantages, will best be understood by reference to the following detailed description, taken in conjunction with the accompanying drawings.

BRIEF DESCRIPTION OF THE DRAWINGS

The accompanying drawings, which are incorporated in and constitute a part of this specification, illustrate several embodiments of the invention and, together with the description, serve to explain the principles of the invention.

DETAILED DESCRIPTION OF THE PREFERRED EMBODIMENTS

Figure 1:
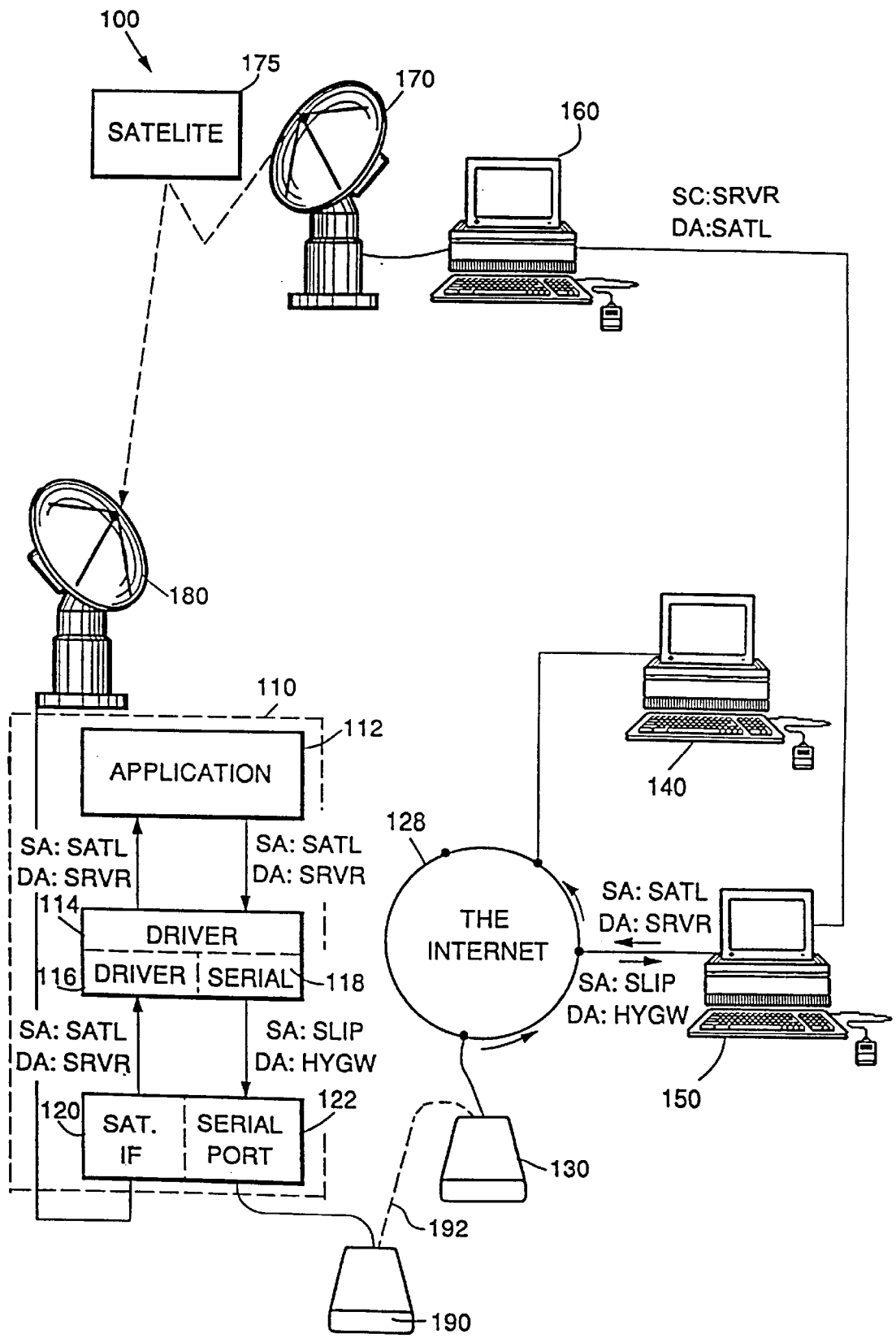
FIG. 1 is a hardware block diagram of a system that may employ the present invention.

Reference will now be made in detail to the preferred embodiments of the invention, examples of which are illustrated in the accompanying drawings. Wherever possible, the same reference numbers will be used throughout the drawings to refer to the same or like parts.

According to a preferred embodiment of the present invention, information downloaded from the Internet is received via a high speed link, such as a satellite link, cable television, optical link or the like, as described in detail below. Alternatively, information from the Internet may be redirected to a terrestrial path depending on conditions at the satellite network.

I. General Overview

A preferred embodiment of the present invention uses satellite, cable or other technology to implement a high-speed one-way link between a user's computer and a TCP/IP network, such as the Internet or a private TCP/IP network. This high-speed link is used to download data from the network. The user's computer also has a conventional TCP/IP link for sending data to the network. The invention can use various forms of high-speed, one-way links, such as satellites or cable television lines. The invention may also use various forms of low-speed networks, such as TCP/IP networks, dialup telephones, ISDN D-channel, CDPD, and low-speed satellite paths.

The described embodiment of the present invention uses satellites to provide a high-speed one-way link. Of course, as stated above, any of a number of high speed links may be used as will be apparent to those skilled in the art. Satellites can cover large geographical areas and are insensitive to the distance between a transmitter and a receiver. In addition, satellites are very efficient at point-to-point and broadcast applications, and are resilient and resistant to man-made disasters. Two-way satellites are expensive to use, however, because of the costs involved in purchasing and installing the uplink satellite earth station hardware. In the past, these costs have placed satellite communications outside the reach of the consumer.

The present invention allows a personal computer to receive downloaded information from the network via satellite at a very practical cost, while allowing a network administrator such as an ISP to dynamically allocate bandwidth on a per-user basis for the downloaded information.

The present invention also allows satellite communications traffic to be redirected to terrestrial networks if the satellite communications path is congested. In the present invention, the cost of satellite communications is reduced because a one-way satellite link is used. Receive-only earth station equipment is less expensive to manufacture because it requires less electronics than send/receive earth stations. Additionally, because the present invention provides ISPs with a way to segment user bandwidth among subscribers, thereby passing additional bandwidth costs to subscribers desiring the additional bandwidth.

As is well-known in the art, communication over the Internet and similar TCP/IP networks is achieved through a group (suite) of protocols called Transmission Control Protocol/Internet Protocol (TCP/IP). The TCP/IP protocol is described in the book "Internetworking With TCP/IP, VOL I" by Douglas Comer, published by Prentice-Hall, Inc., of Englewood Cliffs, N.J., 1991, which is incorporated herein by reference.

A. Hybrid TCP/IP Access

FIG. 1 is a hardware block diagram of a preferred embodiment of the invention. FIG. 1 includes five subsystems: a hybrid terminal 110, a SLIP provider (Internet connection) 130, an application server 140, a hybrid gateway 150, and a satellite gateway 160. The hybrid terminal 110 is connected to a modem 190, which connects to the SLIP provider 130 through a telephone line 192. A satellite transmitter 170, a satellite 175, and a satellite receiver 180 provide a fast, one-way link for transferring data from the satellite gateway 160 to the hybrid terminal 110. The satellite transmitter 170, the satellite 175 and the satellite receiver 180, however, do not themselves necessarily comprise a part of the present invention. Each of the SLIP provider 130, the application server 140, and the hybrid gateway 150 are connected to the Internet 128. As is well-known in the art, the Internet 128 is a "network of networks" and can be visually depicted only in general terms, as seen in FIG. 1.

Each of the hybrid terminal 110, the SLIP provider 130, the application server 140, the hybrid gateway 150 and the satellite gateway 160 preferably includes a processor (not shown) that executes instructions stored in a memory (not shown). Other parts of the invention may also include processors that are not discussed herein, such as I/O processors, etc. Preferably, the hybrid terminal 110, the hybrid gateway 150, and the satellite gateway 160 are implemented as personal computers such as a 166 MHz Pentium based personal computer having 64 MB of RAM and operating on a Windows NT 4.0™ or OS/2™ operating system. However, these elements may be implemented using any data processing system capable of performing the functions described herein. Alternatively, the functionality of both the hybrid gateway 150 and the satellite gateway 160 could be performed in a single gateway unit (not shown) without departing from the spirit or scope of the present invention. In the described embodiment, the SLIP provider 130 is a conventional SLIP provider and the application server 140 is any application server that can connect to the Internet 128 via TCP/IP.

As shown in FIG. 1, the hybrid terminal 110 preferably also includes application software 112, driver software 114, a serial port 122 for connecting the hybrid terminal 110 to the modem 190, and satellite interface hardware 120 for connecting the hybrid terminal 110 to the satellite receiver 180.

Figure 2:
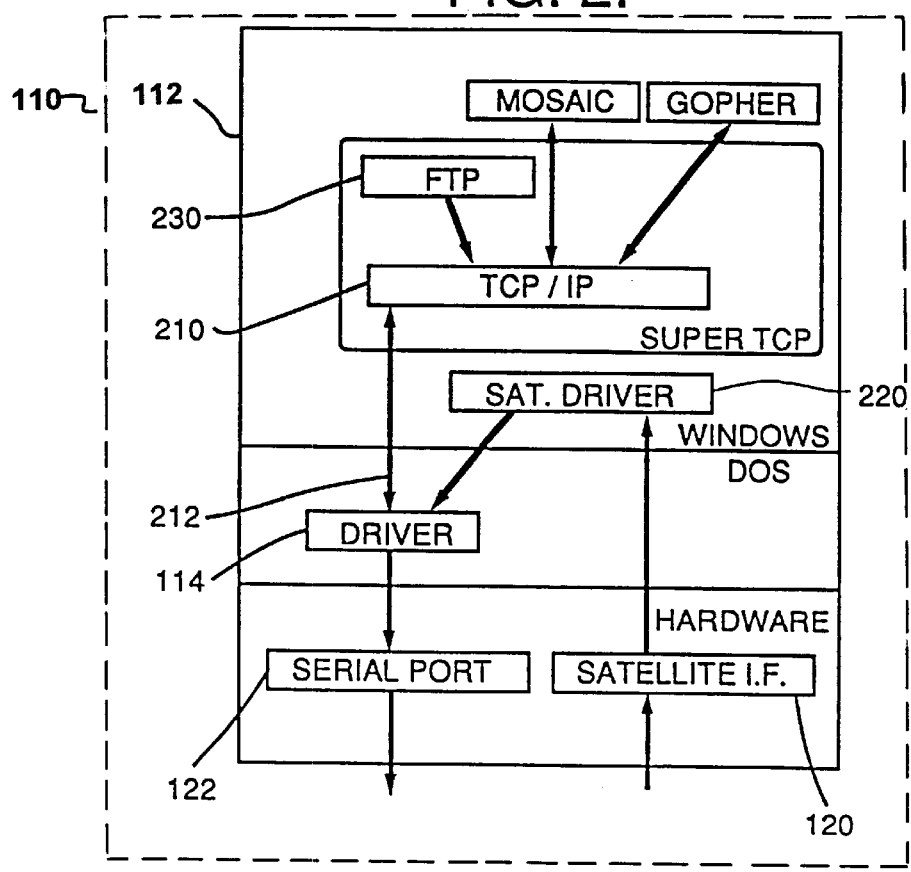
FIG. 2 is a diagram of a portion of a hybrid terminal of FIG. 1.

FIG. 2 shows a relationship between application software 112, driver software 114, serial port 122, and satellite interface hardware 120 of the hybrid terminal 110. The application software 112 preferably includes TCP/IP™ software, such as native Microsoft TCP/IP™ stack or SuperTCP™, manufactured by Frontier, Inc., Chameleon™, manufactured by Netmanager, and IRNSS™, manufactured by SPRY, Inc. The described embodiment preferably operates with the native Microsoft TCP/IP™ package and, thus, uses a standard interface 212 between the TCP/IP software 210 and the driver 114. Examples of standard interface 212 between the TCP/IP software 210 and driver 114 include the Crynson-Clark Packet Driver Specification and the 3Com/Microsoft Network Driver Interface Specification (NDIS). Other embodiments within the scope of the invention may use other standard or non-standard interfaces between the TCP/IP software 210 and the driver 114.

As shown in FIG. 2, the application software 112 preferably also includes well-know Internet utilities, such as FTP 230, and well-known user interfaces, such as Mosaic™ and Gopher™. The application software 112 can also include other utilities, e.g., News and Archie (not shown).

The following describes how a request from the hybrid terminal 110 is carried through the Internet 128 to the application server 140 and how a response of the application server 140 is carried back to the user at the hybrid terminal 110 via the satellite link. (As used herein, the term "satellite link" refers to any portion of the path between the application server 140, the Internet 128, the satellite gateway 160, the satellite transmitter 170, the satellite 175, the satellite receiver 180 and the hybrid terminal 110). The operation of each subsystem will be described below in detail in separate sections.

In the present invention, the hybrid terminal 110 is given two IP addresses. One IP address corresponds to the SLIP provider 130 and is assigned by a SLIP service provider. The other IP address corresponds to the satellite interface 120 and is assigned by a hybrid service provider. IP addresses are assigned by the SLIP and satellite network managers and loaded into the hybrid terminal 110 as part of an installation configuration of the hybrid terminal's hardware and software. These two IP interface addresses correspond to completely different physical networks. The SLIP provider 130 does not "know" anything about the satellite interface IP address or even whether the user is using the satellite service. If a host somewhere in the Internet 128 is trying to deliver a packet to the satellite IP address by using the Internet routing scheme of routers, gateways, and ARPs (Address Resolution Protocols), the only way that the packet can reach the satellite interface IP is to traverse the satellite by being routed through the satellite gateway 160.

The following example assumes that a user at the hybrid terminal 110 desires to send a request to a remote machine, such as the application server 140 that is running FTP (File Transfer Protocol) server software. The FTP software running on the application server 140 receives file transfer requests and responds to them in an appropriate fashion.

Figure 3:
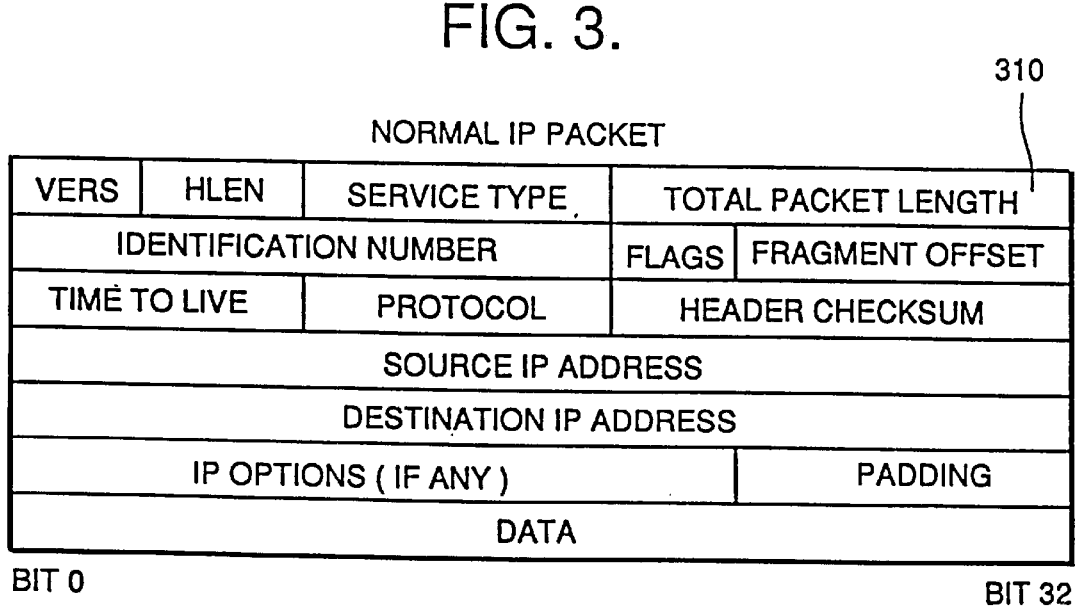
FIG. 3 is a diagram showing an IP packet format.

FIG. 3 is a representation of a normal IP packet that shows the contents of a source field (SA) and of a destination field (DA) of packets sent between the elements of FIG. 1. A request for a file and a response of a file sent from the application server 140 to the hybrid terminal 110 may take the following path.

Figure 4:
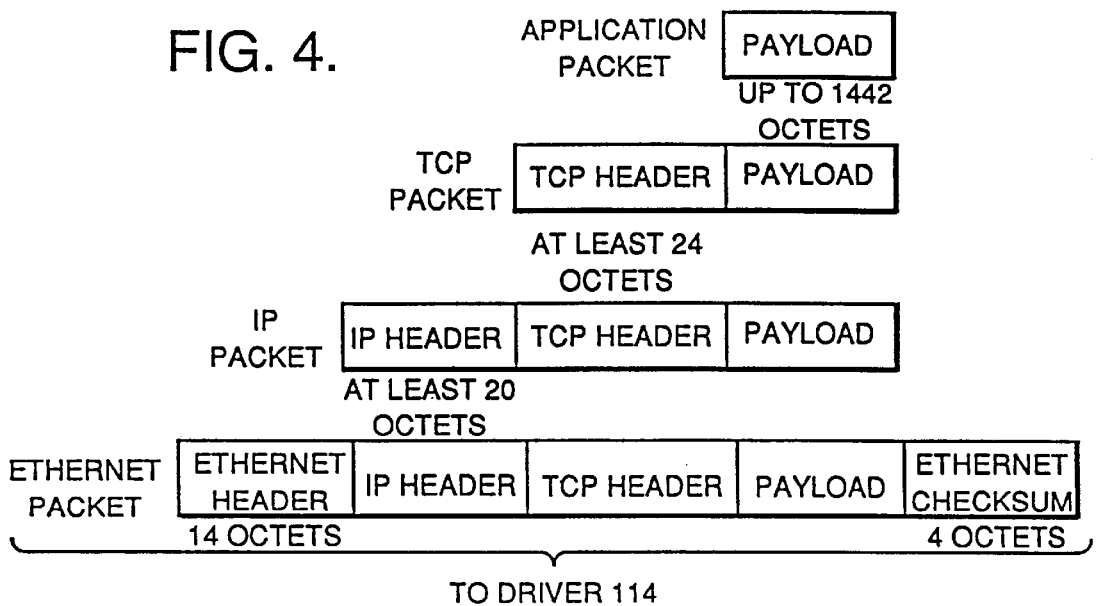
FIG. 4 is a diagram showing a plurality of packet formats, including an Ethernet packet format.

1) Within the hybrid terminal 110, the FTP client software 230 generates a request and passes it to the TCP/IP software 210. The TCP/IP software 210 places the request in a TCP packet (see FIG. 11). The TCP packet includes information such as the source port, the destination port, and an advertized window size. Typically, when a request is made the advertized window size accompanies the request. The advertized window size indicates the window size that the requester will use to receive the information requested. As is known in the art, window size is a data flow control mechanism that represents an amount of information that may be transmitted before an acknowledgment is required. For example, if a window size is 25 bytes, 25 bytes of information can be in transit from the transmitter before an acknowledge is required from the receiver. Therefore, the larger the advertized window size, the faster information can be transmitted. Next, the TCP packet is placed in an IP packet, having a format shown in FIG. 3. The TCP/IP software 210 places the IP packet in an Ethernet packet, as shown in FIG. 4, and passes the Ethernet packet to driver 114. This packet has a source IP address corresponding to the satellite interface 120 and a destination IP address of the application server 140. Ethernet is a packet switching protocol standardized by Xerox Corporation, Intel Corporation and Digital Equipment Corporation, which is described in "The Ethernet" A Local Area Network Data Link Layer and Physical Layer Specification," September 1980, which is available from any of these three companies, and which is incorporated herein by reference.

Figure 5:
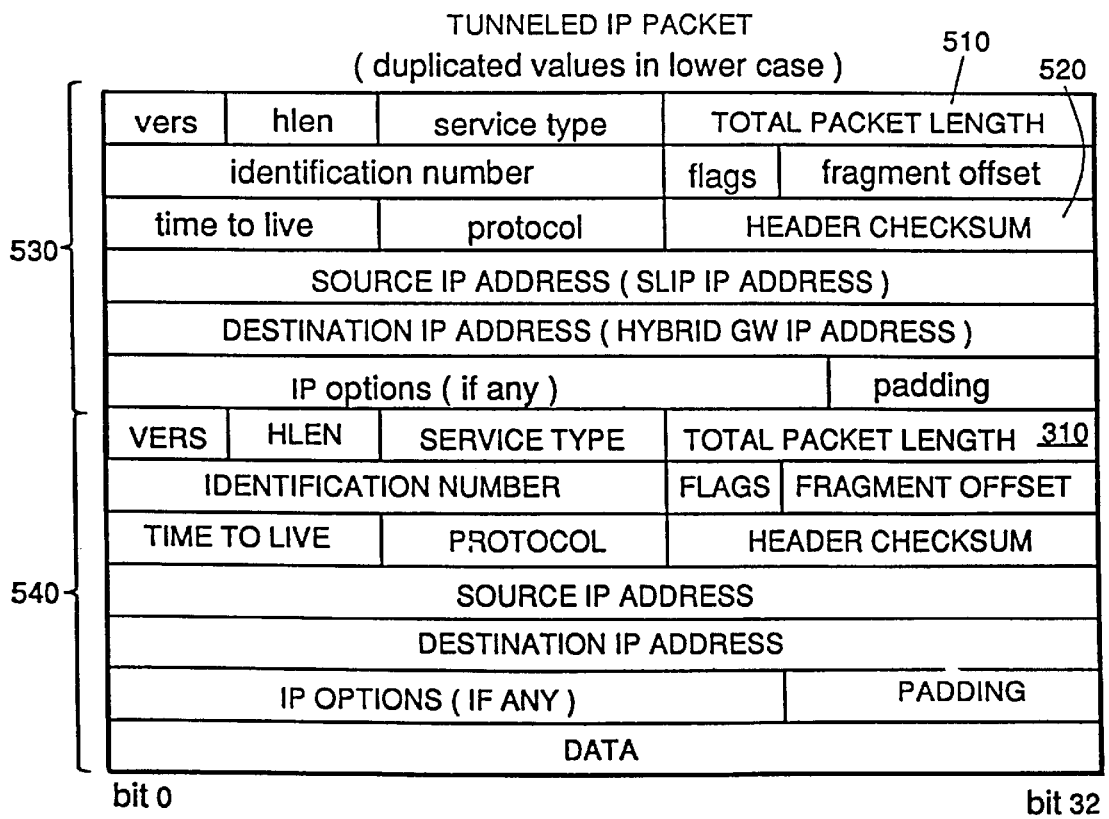
FIG. 5 is a diagram showing a tunneling packet format.
Figure 7:
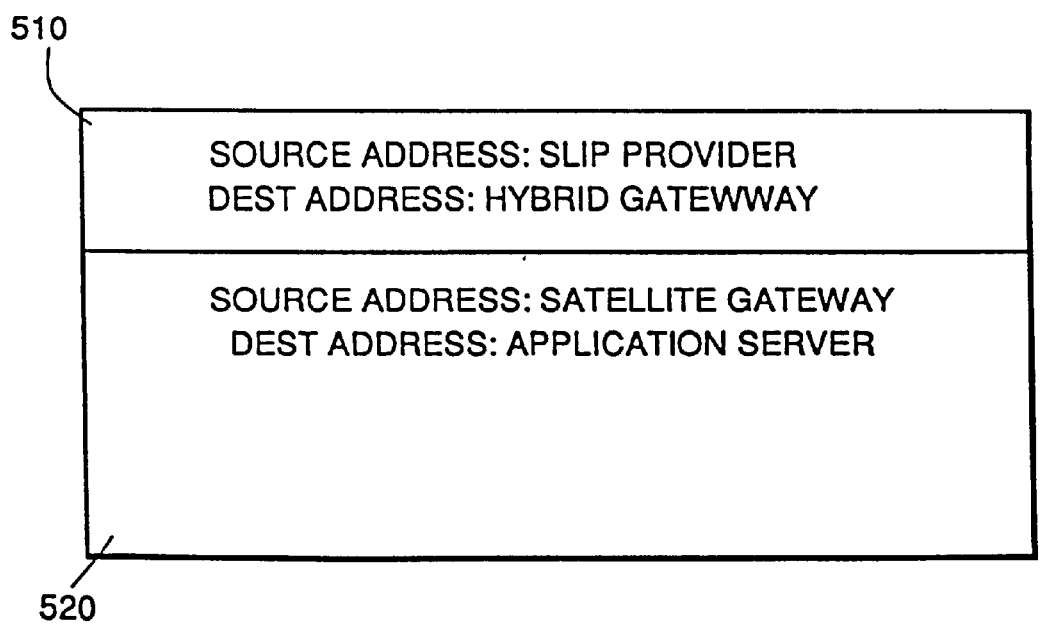
FIG. 7 is a diagram showing an example of partial data in a tunneling packet.

2) In the driver 114, the Ethernet header and checksum are stripped off the packet and the IP packet is encapsulated, or "tunneled," inside of another IP packet, and sent over the serial port 122 to the SLIP provider 130. FIG. 5 shows a format of a tunneled packet. FIG. 7 shows an example of a tunneled packet. The encapsulation adds a new IP header 530 in front of the original packet 540 with a source address corresponding to the SLIP provider 130 and a destination address corresponding to the hybrid gateway 150.

3) The SLIP provider 130 receives the IP packet, analyzes the tunneling header and, thinking it is destined for the hybrid gateway 150, uses standard Internet routing to send the packet to the hybrid gateway 150.

4) When the hybrid gateway 150 receives the packet, it strips off the tunneling header, revealing the true header with the application server 140 as the destination. The software within the hybrid gateway 150 identifies the packet sender using the source address in the true header. Based on the identity of the packet sender, their segmented level of service, and collected statistics regarding usage history, the advertized window size of the TCP packet is modified, if necessary, to throttle the user's bandwidth. Throttling refers to reducing the bandwidth available to the user. Advertized window size indicates the rate at which an information requester is prepared to receive requested data. For example, when A makes a request to B, the request includes an advertized window size that B should use when responding to A. Because user bandwidth is proportional to window size, a decrease in window size results in a decrease in user bandwidth. Therefore, by regulating the advertized window size of each system user, each user's bandwidth can be controlled. After the modification to the advertized window size, the packet is sent back out onto the Internet 128.

5) Internet routing takes the packet to the application server 140, which replies with the requested data and addresses the reply to the request's source IP address, i.e., the IP address of the hybrid terminal's satellite interface 120. Based on the advertized window size sent by the hybrid gateway 150, the application server 140 will adjust its send-window size, thereby increasing or decreasing its transmission data rate.

6) In order to find the hybrid terminal's satellite interface 120, the Internet routing protocol will send the packet to the subnet containing a router/gateway connected to the hybrid gateway 150. When a router on the same physical network as the hybrid gateway 150 sends out an ARP for the IP address of the satellite interface 120 (to find a physical address of satellite interface 120), the hybrid gateway 150 responds with its own physical address. Thus, the application server 140 and the rest of the Internet 128 think that packets sent to the hybrid gateway 150 will reach the hybrid terminal's satellite interface.

7) Once the hybrid gateway 150 receives a reply packet from the application server 140, it sends it to the satellite gateway 160. In the described embodiment, the hybrid gateway 150 encapsulates the packet in a special packet format that is used over the satellite link and uses the satellite interface IP address to uniquely identify the satellite packet's destination. Then the hybrid gateway 150 sends the packet over the Ethernet to the satellite gateway 160. According to the present invention, a decrease in the window size used at the application server 140 will slow the data rate at which the application server 140 transmits the requested data to the hybrid gateway 150. If data is transmitted slower by the application server 140, the hybrid gateway 150 will receive the information slower. Therefore, the rate of information sent to the user is lower and the associated bandwidth is lower.

8) The Satellite gateway 160 broadcasts over the satellite link any packets it receives from the hybrid gateway 150.

9) The driver 114 in the hybrid terminal 110 that services the satellite interface 120 scans all packets broadcast over the satellite transmitter 170 looking for its satellite interface IP address in the header. Once it identifies one, it captures it, strips off the satellite header revealing the reply IP packet, and sends it to the driver 114. The rate at which the data is received by the satellite interface 120 is determined by the window size that was set by the hybrid gateway in step 5. The larger the window size, the higher the data rate.

Thus, IP packets sent into the Internet 128 are carried by the SLIP connection, while IP packets from the Internet 128 are carried at a variable bandwidth via satellite link based on window size. The following describes the operation of each subsystem in further detail.

II. The Hybrid Terminal

The Hybrid terminal 110 is the terminal with which the user interacts. Thus, the hybrid terminal 110 preferably includes a user interface device (not shown) such as a mouse, keyboard, etc. As shown in FIGS. 1 and 2, hybrid terminal 110 includes one or more application programs 112 (including TCP/IP software 210), and driver software 114, which communicates with the SLIP provider 130 through a serial port 122 and the modem 190, using a serial driver portion 118, and which communicates with satellite receiver 180 through a satellite interface 120, using a driver portion 116.

To the TCP/IP software 210, the driver 114 appears to be an Ethernet card, although the driver 114 is actually connected to the satellite receiver 180 (via the satellite interface 120) and to the SLIP provider 130 (via the serial line 122 and modem 190, respectively). Thus, the TCP/IP software 210 believes that it is communicating with a single physical network, when it is, in reality, communicating with two physical networks (the SLIP dial up network and a satellite network).

Figure 6:
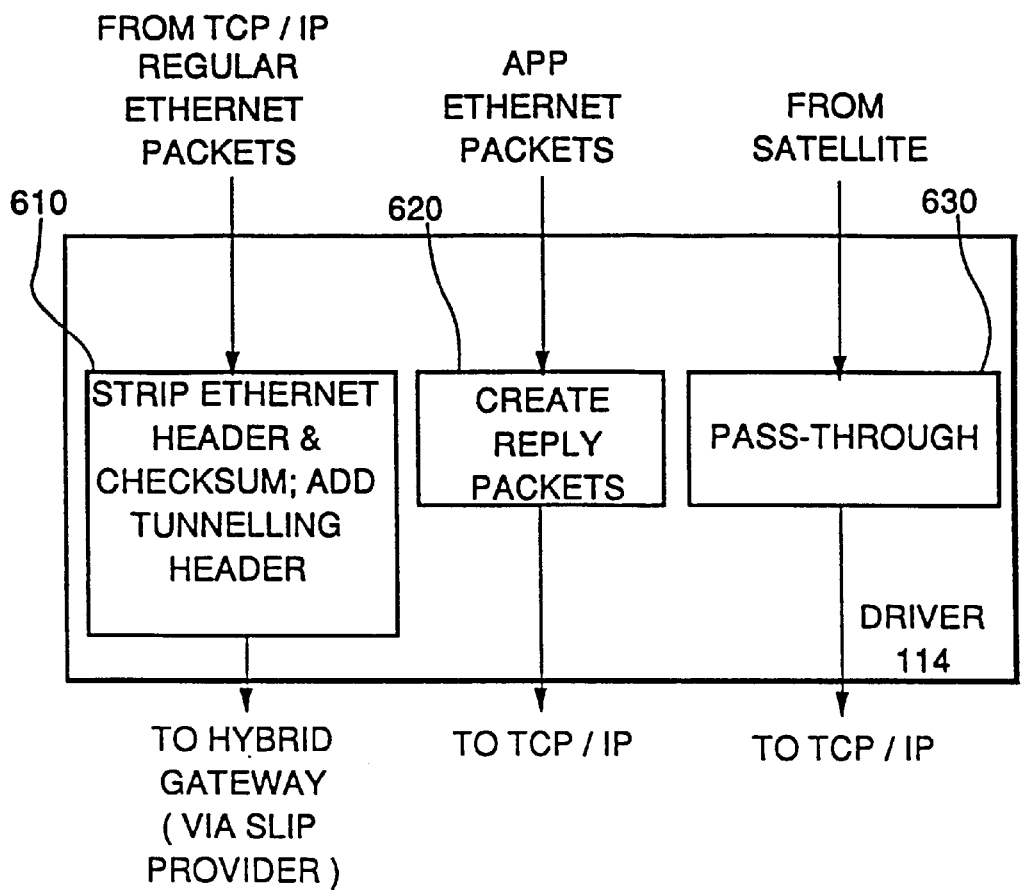
FIG. 6 is a diagram of steps performed by the hybrid terminal of FIG. 2.

FIG. 6 is a diagram of steps performed by the driver 114 of the hybrid terminal 110 of FIG. 1. The driver 114 receives packets of data from the TCP/IP software 210 and passes them to the SLIP provider 130 via the serial port 122 and the modem 190. A packet sent by the application server 140 is received through the satellite receiver 180, passes through the satellite interface 120, to the satellite driver 220 and the driver 114, which passes the received packet to the TCP/IP software 210.

The following paragraphs discuss two basic functions performed by the driver 114 (tunneling and ARP handling) and discusses various implementation details for the preferred embodiment.

A. "Tunneling"

As discussed above, the hybrid terminal 110 has two IP addresses associated with it: one for the SLIP provider 130 and one for the satellite interface 120. Packets containing requests are sent from the hybrid terminal 110 to the application server 140 via the Internet 128, while packets containing a reply are sent back via the satellite link. Tunneling is the method by which the application server 140 is "fooled" into sending a reply to a different IP address (the satellite interface 120) than that of the sender (the serial port 122).

A packet received by the driver 114 from the TCP/IP software 210 has a source address of the satellite gateway 160 and a destination address of the application server 140. As shown in step 610 of FIG. 6, the driver 114 removes the Ethernet header and checksum and encapsulates the IP header into an IP tunneling header having a source address of the SLIP provider 130 and a destination address of the hybrid gateway 150 (see FIG. 7). As described above, at the hybrid gateway 150, the tunneling header is removed and the packet is sent back into the Internet 128 to be sent to the application server 140 with a variable window size to control the rate at which the application server 140 transmits data to the hybrid gateway 150.

When forming a tunneling header, the driver 114 copies all the values from the old header into the new one with the following exceptions. The source and destination addresses of the tunneling header change, as described above. In addition, a total packet length field 510 is changed to contain the contents of length field 310 plus the length of the tunneling header. Lastly, the driver 114 recalculates checksum 520 of the tunneling header because some of the fields have changed.

B. ARP Handling

ARP (Address Resolution Protocol) is used by TCP/IP to dynamically bind a physical address, such as an Ethernet address, to an IP address. When TCP/IP finds an IP address for which it does not know a physical address, TCP/IP broadcasts an ARP packet to all nodes, expecting a response that tells TCP/IP what physical address corresponds to the IP address.

During initialization, the driver 114 declares to the TCP/IP software 210 that the driver 114 is an Ethernet card to ensure that the packets that TCP/IP package sends are Ethernet packets and that the TCP/IP package will be prepared to receive packets at a high-rate of speed. As shown in step 620 of FIG. 6, when the driver 114 detects that TCP/IP has sent an ARP packet, the driver 114 creates a physical address and sends a reply packet to the TCP/IP software 210. The contents of the physical address are irrelevant, because the driver 114 strips off the Ethernet header on packets from TCP/IP before the packets are sent to the SLIP provider 130.

C. Other Functions

As shown in step 630 of FIG. 6, packets received by the driver 114 from the satellite receiver 180 (via satellite driver 114) are passed to the TCP/IP software 210. The following paragraphs discuss implementation details for the described embodiment.

In a preferred embodiment, the TCP/IP software 210 (e.g., Microsoft's TCP/IP stack or Frontier's SuperTCP) sends an ACK (acknowledge) for every packet it receives, even though this action is not required by the TCP/IP protocol. In this situation, many packets compete for the slow link to the SLIP provider 130. In TCP/IP, the ACK scheme is cumulative. This means that when a transmitter receives an ACK stating that the receiver has received a packet with sequence number N, then the receiver has received all packets with sequenced numbers up to N as well, and there is no reason why every packet needs to be ACK'ed.

Figure 8:
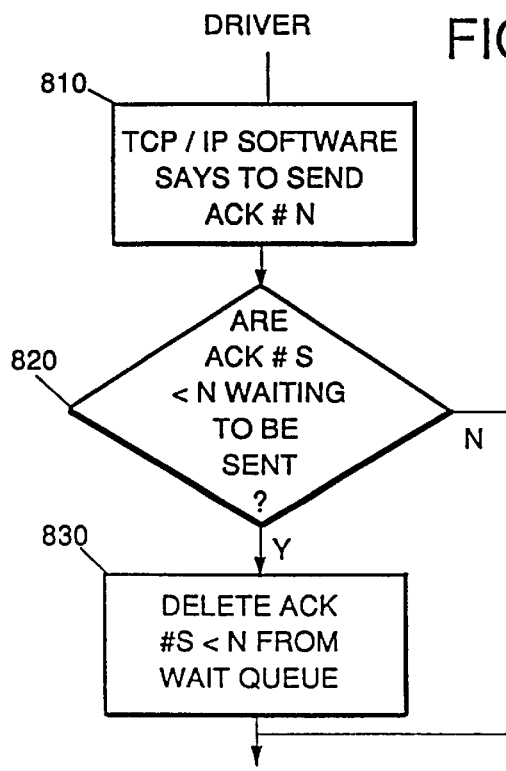
FIG. 8 is a flowchart of steps performed by the hybrid terminal of FIG. 2.
Figures 10, 11:
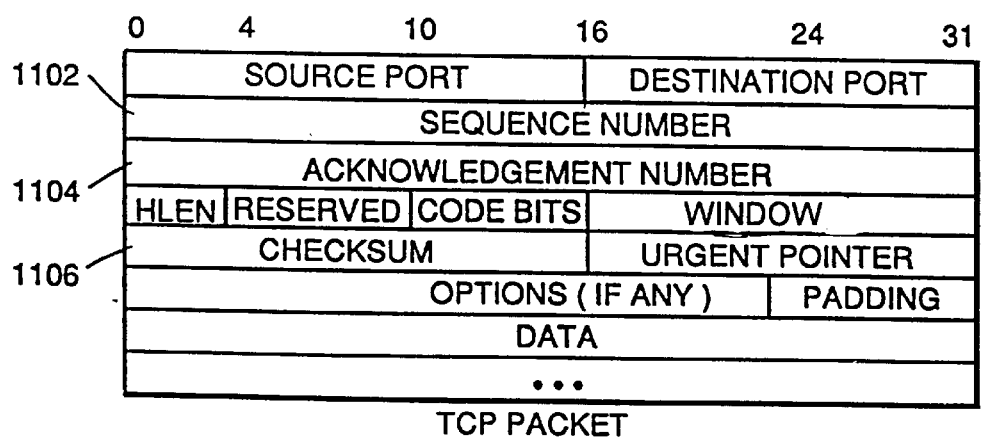
FIG. 10 is a diagram showing a format of packets sent to a satellite gateway of FIG. 1.
FIG. 11 is a diagram showing a TCP packet format.

FIG. 8 is a flowchart of steps performed in a preferred embodiment by the driver 114 of the hybrid terminal 110. FIG. 11 is a diagram showing a preferred TCP packet format. FIG. 11 includes a sequence number field 1102, an acknowledgment (ACK) number field 1104, and a checksum field 1106. In step 810 of FIG. 8, the driver 114 receives an ACK packet with sequence number N from the TCP/IP software 210. The packet is queued along with other packets waiting to be sent to the SLIP provider 130. In step 820, the driver 114 checks to determine whether there is a "run" of sequential packets waiting to be sent. If so, in step 830, the driver 114 deletes ACK packets for the same TCP connection that have sequence numbers in the run from the queue and sends an ACK only for the highest sequence number in the run. This action alleviates the bottleneck caused by the relatively slow modem speeds.

The serial port 122 provides a physical connection to the modem 190 and, through it, to the terrestrial network via a SLIP protocol as described below in connection with the SLIP provider 130. Serial data is sent and received through an RS-232 port connector by a UART (Universal Asynchronous Receiver Transmitter), such as a U8250, which has a one byte buffer and is manufactured by National Semiconductor, or a U16550, which has a 16 byte buffer and is manufactured by National Semiconductor.

The invention preferably operates under the DOS™ and Windows™ operating systems, but also can operate under other operating systems.

The satellite driver software 220 receives packets from the satellite receiver 180, and passes them to the driver 114 using a DOS call. Thus, the two physical links are combined within the driver 114 and the existence of two physical links is transparent to the TCP/IP software 210. The satellite driver 220 scans all packets transmitted over the satellite channel for a packet with a header corresponding to the IP address of the satellite interface 122, performs some error detection and correction on the packet, buffers the received packet, and passes the packet to the driver 114 using a DOS call, e.g., IOCTL-output-cmd( ). The driver 114 copies data from the satellite driver 220 as quickly as possible and passes it to the TCP/IP software 210.

As discussed above, the TCP/IP software 210 is fooled into thinking that it is connected to an Ethernet network that can send and receive at 10 Mbps. This concept is helpful on the receive side because data from the satellite or other high speed data sources is being received at a high rate. On the transmit side, however, the modem 190 is not capable of sending at such a high rate. In addition, the TCP/IP software 210 sends Ethernet packets to the driver 114, i.e., an IP packet is encapsulated into an Ethernet packet. Because the SLIP provider 130 expects IP packets, the driver 114 must strip the Ethernet header before the packet is sent to the SLIP provider 130.

As described above in connection with FIG. 8, the driver 114 also includes a transmit and receive queue. As data is received from the TCP/IP software 210 and received from the satellite driver 220, it is buffered within the queue. When the queue is full, e.g., when TCP/IP is sending packets faster than the modem 190 can send them, the driver 114 drops the packets and returns an error so that the TCP/IP software 210 will decrease its rate of transmission.

In a first preferred embodiment, a SLIP connection is initiated with an automatic logon procedure. In another preferred embodiment, the driver 114 executes instructions to allow a user to perform a SLIP logon manually.

Because the TCP/IP software 210 preferably is configured to talk to the Ethernet and it is desirable to receive the largest packet size possible, the driver 114 configures TCP/IP so that the MTU (Maximum Transmission Unit) of the network is as large as possible, e.g., 1500 bytes. Some SLIP providers 130 have a smaller MTU, e.g., 512 bytes. To handle the disparity in size, the driver 114 segments large packets received from the TCP/IP software 210 into segments the size of the SLIP MTU. Once a packet is segmented, it is reassembled in the hybrid gateway 150. Only the tunneling header is copied as the header of the segments.

III. The SLIP Provider

The SLIP provider 130 performs the function of connecting the hybrid terminal 110 to the Internet 128. As described above, other protocols, such as PPP (point to point protocol), could also be used to perform the connecting function. SLIP server 130 receives SLIP encoded IP packets from the modem 190, uncodes them, and forwards them to the hybrid gateway 150 via the Internet 128.

In its most basic form, the SLIP provider 130 delimits IP packets by inserting a control character such as hex 0xC0-SLIP between them. To insure that a data byte is not mistaken for the control character, all outgoing data is scanned for instances of the control character, which is replaced by a two character string. The SLIP protocol is described in detail in J. Romkey, "A Nonstandard for Transmission of IP Datagrams over Serial Lines: SLIP," RFC 1055, June 1988, pp. 1–6, which is incorporated herein by reference.

IV. The Application Server

The application server 140 is a computer system running any combination of known application programs available on the Internet 128 using the TCP/IP protocol suite. For example, the application server 140 may transfer files to requesting users via FTP. In this regard, the application server 140 may be thought of as a host computer. Although the hybrid terminal 110 actually has two IP addresses (a serial port address and an address for the satellite interface), the software executing on the application server 140 thinks that it is receiving requests over the satellite network and sending responses over the satellite network. The hybrid terminal 110 is completely transparent to the application server 140.

The application server 140 receives the request and determines the window size that should be used for its response. The response window size is determined from the advertized window size specified in the TCP request. If necessary, the advertized window size of the TCP request is changed before the hybrid gateway 150 makes the request of the application server 140. Therefore, the application server responds at the TCP advertized window size, which may be used to reduce user bandwidth.

V. The Hybrid Gateway

Although only one hybrid terminal 110 is shown in FIG. 1, the invention can include a plurality of hybrid terminals 110. Preferably, all packets sent from all hybrid terminals 110 pass through the hybrid gateway 150 to get untunneled and have their advertized window size changed, if necessary. Thus, the hybrid gateway 150 is a potential system bottleneck. Because of this potential bottleneck, the functions of the hybrid gateway 150 are as simple as possible and are performed as quickly as possible. The hybrid gateway 150 has good Internet connectivity to minimize the accumulated delay caused by packets waiting to be processed by the hybrid gateway 150. The hybrid gateway 150 further performs the function of throttling data flow based on subscriber service level and subscriber time-averaged throughput. Throttling is accomplished by.

Figure 9:
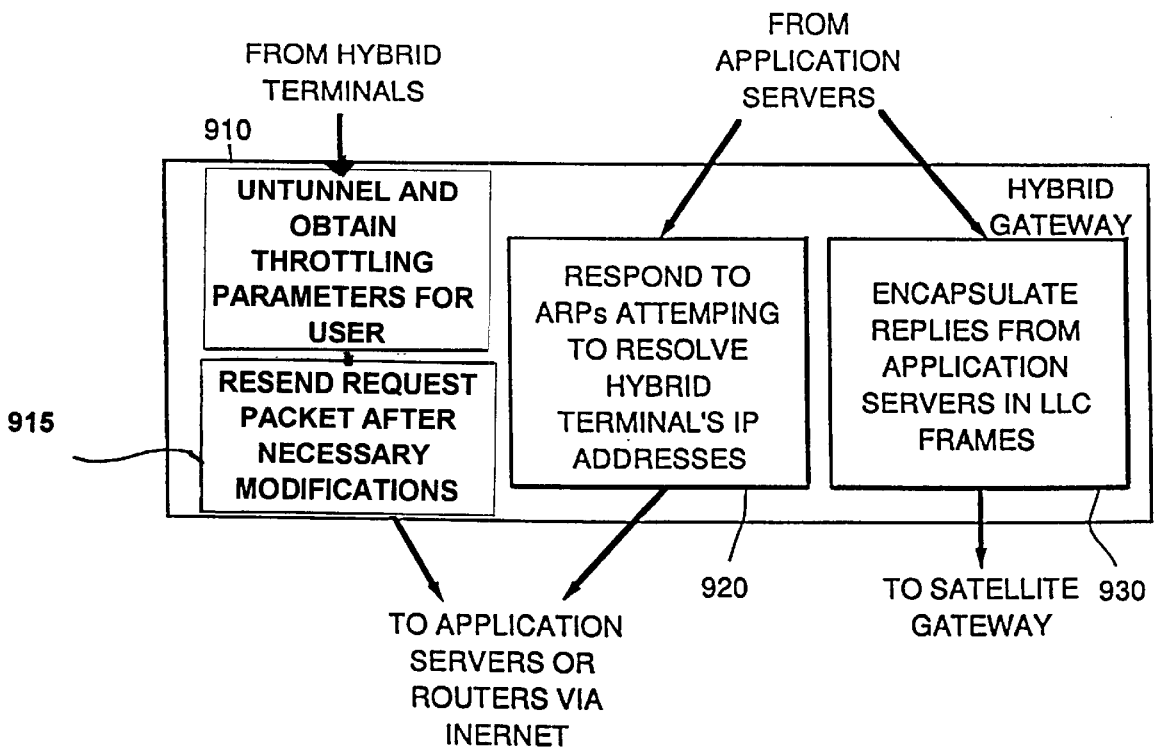
FIG. 9 is a diagram of steps performed by a hybrid gateway of FIG. 1.

FIG. 9 is a diagram of steps performed by the hybrid gateway 150 of FIG. 1. In step 910, the hybrid gateway 150 receives a tunneled packet representing a user request. The tunneled packet has a format shown in FIG. 5. The hybrid gateway 150 "untunnels" the packet by stripping off the tunneling header and determines the throttling parameters based on the user service plan and running average throughput. Step 910 also performs the function of calculating the throttling, if any, to be applied to the request. After the completion of step 910, a step 915 appropriately modifies the packet to reflect throttling, which is typically done through manipulation of advertized window size as specified in the TCP communication layer (see FIG. 11). After step 915 has appropriately adjusted the TCP window size the packet is passed to the Internet 128.

As described above, packets are sometimes broken into segments when they are sent in order to accommodate a small MTU of the SLIP provider 130. Packets may also be segmented as they pass through other elements of the Internet 128 having small MTUs. For fragmented packets, only the tunneled header is copied into the header of each segment. The hybrid gateway 150 stores fragmented packets in a memory (not shown) and reassembles them in order before untunneling the original packet and passing it to the Internet 128. Preferably, a "time to live" value is assigned to each packet when it is sent by the driver 114 and if all segments do not arrive before a time to live timer expires, the packet is discarded.

A. Throttling

1. Throttling Based on Running Average Throughput

Figure 14:
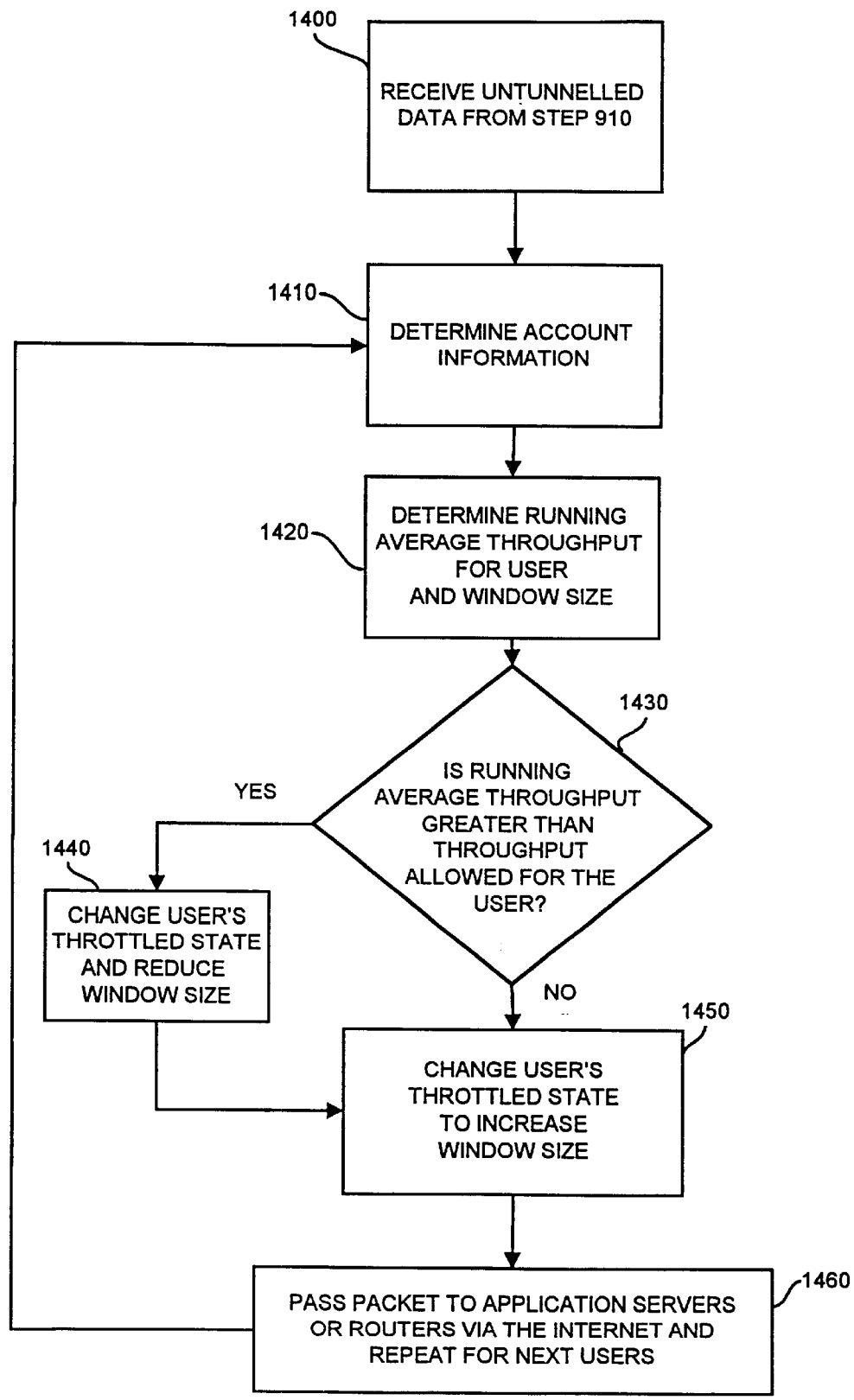
FIG. 14 is a detailed diagram showing the steps performed by step 915 of FIG. 9.

Referring to FIG. 14, a detailed flow diagram of the throttling process as performed by step 915 of FIG. 9 is shown. The process begins when a step 1400 receives untunneled data from step 910. Step 1410 determines account information for the user that made the request. Account information may include the user's service plan or level of service and the user's current state, which in turn correspond to the user's allowed peak and average data throughput rate. The hybrid gateway 150 maintains information on the various service plans to which customers may subscribe and each user's usage and state information.

The hybrid gateway 150 preferably maintains parameters on average throughput thresholds, allowed peak throughput rates and UDP discard rates for different levels of throttling for each service plan. This information is used to determine if a user's data throughput, or bandwidth, should be throttled. The throughput thresholds are measured in kilobits per second (kbps) and define the data rates for use as different throttling levels. The preferred embodiment defines two such levels, referred to as soft and hard throttling. Each level has a corresponding peak throughput rate (measured in kbps) and a UDP discard rate. In the preferred embodiment, these rates are referred to as peak_soft_throttle throughput, peak_hard_throttle throughput, UDP_soft_discard, and UDP_hard_discard. When user's throughput exceeds the soft or hard throughput thresholds, the user's allowed peak throughput is set to a soft or hard peak throughput rate. For example, one service plan may a have peak throughput of 400 kbps, 200 kbps, and 100 kbps when unthrottled, soft throttled, and hard throttled, respectively.

The UDP hard and soft discard rates represent the rates at which UDP packets are discarded to decrease data throughput. For example, for a particular service plan, the hard and soft UDP discard rates may be 1 in 50 and 1 in 1000, respectively. It should be noted that all of the thresholds and rates disclosed in conjunction with throttling and FIG. 14 are exemplary and in the preferred embodiment of the present invention are fully programmable.

The throttling and UDP discard rates can be obtained by examining the user's service plan and the user's state. In order to make the throttling process fast and efficient and to add some hysteresis to the process, the user's state calculation is done only at periodic intervals. In a preferred embodiment, the interval is one minute.

A user's state depends on the user's service plan and the user's running average throughput. The running average throughput or the time-averaged data rate is maintained using a leaky bucket approach, similar to one used for rate-based flow control in a frame relay system. In the preferred embodiment, a bucket is maintained for each user and contains high-water marks or thresholds based on a user's service plan. Each packet downloaded by the user causes the "water level" in the bucket to rise equal to the packet size in bytes. The bucket leaks at a rate defined by the user's service plan. The leak rate may vary depending on whether the user is connected or disconnected to the network. The leak rates determine the average data rate that can be sustained by a user without the user's data throughput being throttled. The bucket thresholds determine the size of bursts (over the average rate) that can be sustained by a user for an amount of time without the user's data throughput being throttled. For example, a soft threshold of 100 kbps with a leak rate of 64 kbps and a running average duration of 60 minutes implies that a 36 kbps burst can be sustained over and above an average of 64 kbps for 60 minutes without incurring throttling. With the same parameters, a 72 kbps burst can be sustained over and above the 64 kbps average for 30 minutes without incurring throttling.

In the preferred embodiment, the state calculation and bucket leak operations are performed once per minute. If the amount of data in the user's bucket exceeds any of the thresholds, the user is placed in a corresponding throttled state. Since different peak throughputs are defined for different states, the user's throughput will vary depending on the user's state. In accordance with the present invention, the first few minutes of usage may be excluded from a user's state calculation. This prevents the user from being throttled immediately. Accordingly, a user's initial experience while using the system of the present invention will be better than if the user were to be immediately throttled. During the first few minutes of unthrottled usage, window size will be set to the maximum size possible.

Various rules may be used to assign priority to different types of data. One such rule may include prioritizing data for transmission based on the type of connection made by the requesting terminal. One exemplary prioritization may be such that real time traffic may be assigned the highest priority, broadcast traffic may be assigned the next highest priority, interactive TCP, UDP and all other IP traffic may be assigned the third highest priority, and Bulk TCP traffic (e.g., FTP, HTTP, NNTP, etc.) may be assigned the lowest priority.

Additionally, the throttling mechanism may be configured to have minimal effect on interactive, or time-sensitive, TCP traffic and other IP traffic, while throttling bandwidth-intensive applications. The hybrid gateway 150 may use an amount of unacknowledged TCP data in the recent past to detect response-time sensitive and bandwidth-intensive applications.

A step 1420 uses the state information and user's service plan to compute the allowed peak throughput. It then uses the throughput value and the round-trip time estimates to compute the TCP window size if the user's request is for TCP data. In addition to throughput, the number of TCP connections that a user has open, the type of connections, and the type of data being transferred may be used as metrics when determining if a user should be throttled. Determining the type of data being requested includes examining a data packet and calculating an amount of unacknowledged data in the TCP connection queue.

A step 1430 then compares the user's running average throughput to the user's throughput thresholds for his/her service plan. If the running average throughput is greater than the throughput thresholds, control is passed to step 1440. Step 1440 changes the user's state to throttle data throughput and reduce window size.

If running average throughput is less than the throughput thresholds, control is passed to block 1450, which changes the user's state to reduce throttling of throughput and increase window size. After the execution of either step 1440 or step 1450, control is passed to step 1460, which passes the data packet containing the request to data packet application servers 140 on routers via the Internet 128 and restarts the throttling process for the next user. The functions performed by step 915 are the objects of the present invention. Bucket sizes, thresholds, peak throughputs, and bucket leak rates are fully programmable in the preferred embodiment of the present invention.

2. Flow Control Mechanism

The hybrid gateway 150 also includes a flow control mechanism for regulating the volume of information broadcast by the satellite gateway 160. The flow control mechanism maintains a measurement of the communications load on the satellite gateway 160. Load conditions may be measured by measuring the latency of data packets in the transmit queue. Preferably, this measurement is maintained over a range of 1% to 100%; wherein 1% represents a high load on the satellite gateway 160 and 100% represents no load on the satellite gateway 160. The effective window size of user is multiplied by the satellite gateway 160 load measurement. Therefore, when communications traffic is low, each user's effective window size will be multiplied by 100% and will not be reduced.

Conversely, when communications traffic is high at the satellite gateway 160, each user's effective window size is multiplied by the measurement, which may be e.g., 50%. Therefore, when satellite gateway 160 traffic is high, each user's window size will be reduced by the same percentage.

Throttling Based on Historical Usage Patterns

In other embodiments of the present invention, historical usage patterns may be used to exempt users from having their bandwidth throttled. This feature is intended to ensure that historically low data throughput users can get high data throughput volumes on a periodic basis, while historically high data throughput users are throttled when they abuse system resources. Historical usage patterns for a number of days may be generated once per day. For example, a user's historical usage over the past "N" (e.g., 30 or 60) days will be generated and compared to a user's service plan to determine if the user should be in an exempt plan for low-usage users or a non-exempt plan for high-usage users. In an exempt plan, a user cannot be throttled. Conversely, in a non-exempt plan, a user may be throttled.

For each user, the NOC must acquire daily usage data that includes:

1) An identifier for a particular user site, which may be noted as "Site ID."
2) Data that indicates the date of the daily usage data, which may be noted as "Usage Date."
3) The number of bytes of data sent over the satellite to that site, which may be noted as "Bytes TX."

Accordingly, usage over the past "N" days can be calculated using past daily usage data.

To implement throttling based on historical usage patterns, the NOC must compare the data transferred to a user with stored thresholds. These thresholds may include, but are not limited to:

1) A threshold indicating the maximum number of bytes that can be sent to a user over a satellite in the last "N" days (e.g., 30 or 60 days) before the user is switched to a non-exempt plan may be noted as "MaxNDays Threshold."
2) A threshold indicating the minimum number of bytes that can be sent to the user over a satellite in the last "N" days (e.g., 30 or 60 days) before the user is switched to an exempt plan, which may be noted as "MinNDays Threshold."
3) A threshold indicating the maximum number of bytes that can be sent to the user over a satellite in the previous day before the user is switched to an non-exempt plan, which may be noted as "Max1Day Threshold."
4) A threshold indicating the minimum number of bytes that can be sent to the user over a satellite in the previous day before the user is switched to an exempt plan, which may be noted as "Min1Day Threshold."

The "1Day" thresholds are selected such that a person in an exempt plan will have a higher "Max1Day" threshold that a person in an non-exempt plan. This selection of thresholds allows a user who is in an exempt plan to have a higher one day download total than a user who is in an non-exempt plan. The concept is that a chronic over-user that is in the non-exempt plan should not be given the one-day latitude that a rare over-user in the exempt plan is given.

During operation the NOC examines the daily usage table for each user site. If a user's usage statistics indicate that he/she has downloaded an amount of data over either the "MaxNDay" threshold or the "Max1Day" threshold, the user will be placed in the non-exempt group and his/her data throughput may be throttled. Conversely, if the user's statistics indicate that the amount of data transferred is below either the "MinNDay" threshold or the "Min1Day" threshold, the user will be placed in the exempt group and his/her bandwidth will not be subject to throttling. For example, if a user's "MaxNDays" threshold is set to 100 MB over 30 days, a user will be placed in the non-exempt group. Once a user is in the non-exempt group, the user's "MinNDays" threshold may be set to 50 MB over 30 days. Accordingly, a non-exempt user will return to being an exempt user when his/her data throughput over 30 days is lower than 50 MB.

B. ARP Responding

Preferably, the satellite gateway 160 is on a same physical network as the hybrid gateway 150. As shown in step 920 of FIG. 9, when a router on the same physical network as the satellite gateway 160 and the hybrid gateway 150 sends out an ARP for the IP address of the satellite interface 120 (to find a physical address of the satellite Interface 120) the hybrid gateway 150 responds and says "send it to me." The hybrid gateway 150 needs to intercept packets intended for the satellite Interface 120 because it needs to encapsulate packets for the satellite gateway 160 as follows.

C. Satellite Packetizing

The following describes how packets travel from the application server 140 through the hybrid gateway 150 and to the satellite gateway 160. The following explanation is given by way of example and is not intended to limit the scope of the present invention. As shown in step 930 of FIG. 9, the hybrid gateway 150 encapsulates replies from the application server 140 into a satellite packet format. FIG. 10 is a diagram showing a format of a satellite packet sent to the satellite gateway 160 of FIG. 1. A satellite packet includes the data 1010 of an original IP packet, and a satellite header 1020, and a LLC-1 header 1030 added by the hybrid gateway 150.

The satellite gateway 160 expects IP packets to be encapsulated first in a special satellite packet and then within an LLC-1 IEEE 802.2 link level control, type 1 packet. The satellite header 1020 identifies the downlink and contains a sequence number and the packet length. The LLC-1 header 1030 preferably is used to send the packet to the satellite gateway 160, in an Ethernet LAN. The hybrid gateway 150 prepares packets for the satellite gateway 160 by appending headers 1020 and 1030 to the front of an IP packet 1010.

The receiver in the hybrid terminal 110 does not receive the LLC-1 header 1030. The hybrid terminal 110 identifies packets intended for it by checking a least significant byte in the satellite IP address. Thus, a six-byte satellite destination address is determined by reversing an order of bytes of the satellite IP address for the hybrid terminal 110 and then padding the rest of the address with zeroes.

VI. The Satellite Gateway

The satellite gateway 160 can include any combination of hardware and software that connects the satellite transmitter 170 to the hybrid gateway 150. The satellite transmitter 170 and the satellite receiver 180 can be any combination of hardware and software that allows data to be transmitted by the satellite transmitter 170 and received by the satellite receiver 180, and to be input to the hybrid terminal 110. For example, the satellite gateway 160 preferably is a personal computer with a high-speed Ethernet connection to hybrid terminal 110. When the satellite gateway 160 receives a packet from the hybrid gateway 150, it sends it over the satellite link.

Satellite communication may be effected by, for example, the Personal Earth Station or the VSAT designed and manufactured by Hughes Network Systems. In a preferred embodiment, a one-way version of the Personal Earth Station is used. Yet another embodiment uses a system that allows the hybrid terminal 110 to be connected directly to the satellite receiver 180 via Hughes Network Systems' DirecPC® product.

At the downlink, the satellite receiver 180 includes a 0.6 meter receive-only antenna receiving HDLC encapsulated LAN packets. Satellite interface 120 includes rate ⅔ Viterbi/Reed-Soloman concatenated forward error correction.

A. Protocol Spoofing

TCP/IP protocol specifies that only a predetermined number of packets can be outstanding during transmission, i.e., that only a limited number of packets can be sent before an ACK (acknowledgment) is received. The high bandwidth and long delays incurred in sending packets to an orbiting satellite and back means that at any given time, a large number of packets may be "in the pipe" between transmitter and receiver.

When using conventional TCP/IP protocol, the application server 140 sends a predetermined number of packets in accordance with a predetermined window size, and then waits to receive ACKs over the modem link before sending additional packets. The purpose of windowing is to limit a number of packets that must be re-sent if no ACK is received and to provide flow control, e.g., to prevent sending packets faster than they can be received. The packets that have not been ACK'ed are stored in a memory so that they can be re-sent if no ACK is received.

In a preferred embodiment of the present invention, the hybrid gateway 150 "spoofs" the application server 140 to improve the throughput over the satellite link. Specifically, the hybrid gateway 150 sends an ACK to the application server 140, even though a corresponding packet may not have been received by the hybrid terminal 110 via the satellite at the time.

Figure 12:
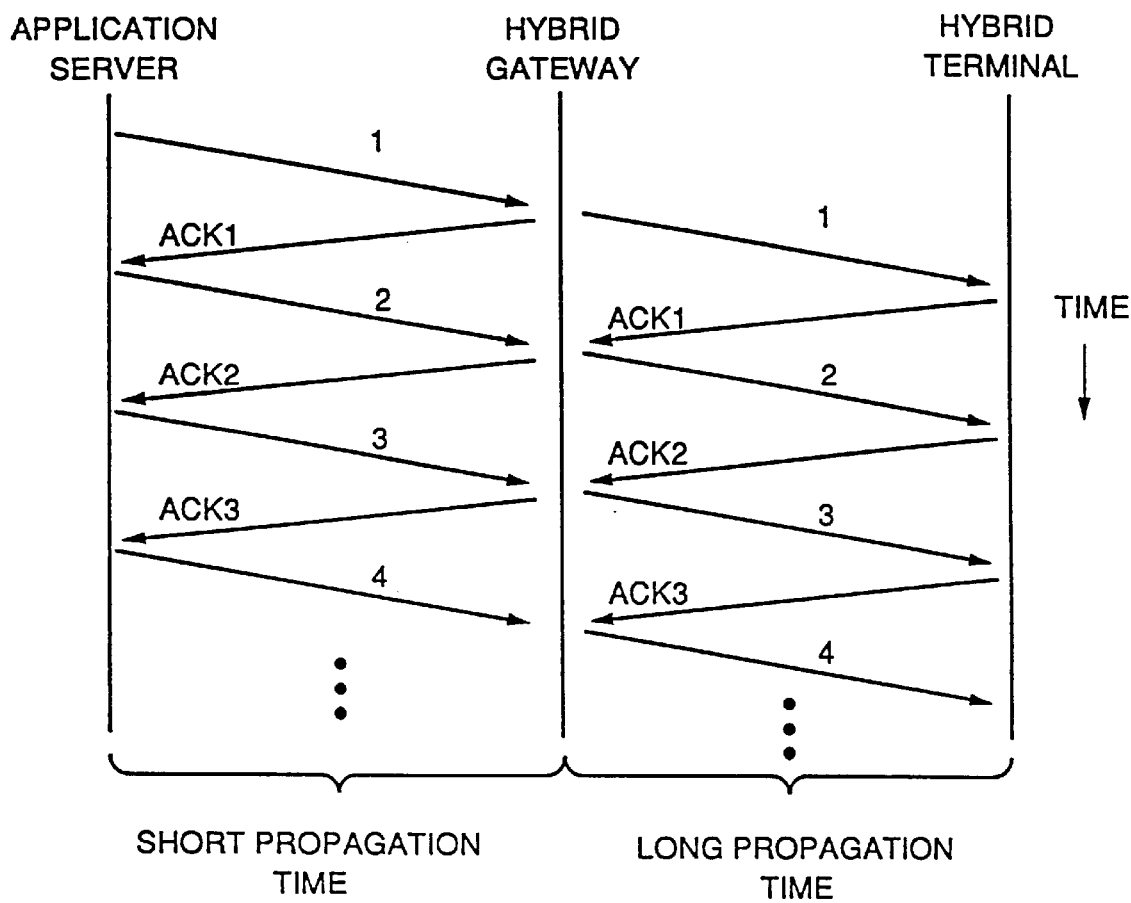
FIG. 12 is a ladder diagram showing packets sent from an application server to the hybrid gateway and from the hybrid gateway to the hybrid terminal over a satellite link.
Figure 13A:
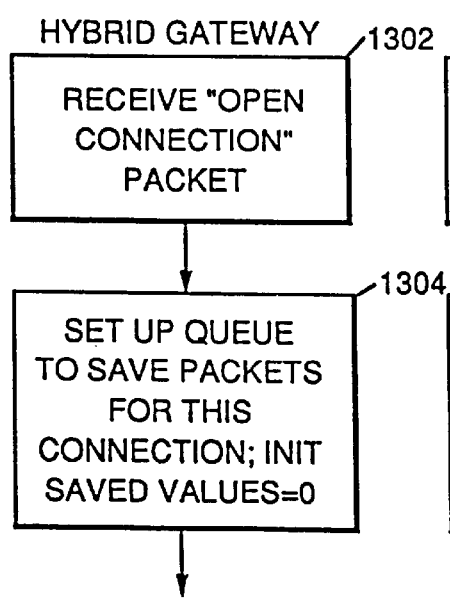
FIGS. 13(a) through 13(e) are flowcharts of steps performed by the hybrid gateway of FIG. 1.
Figure 13B:
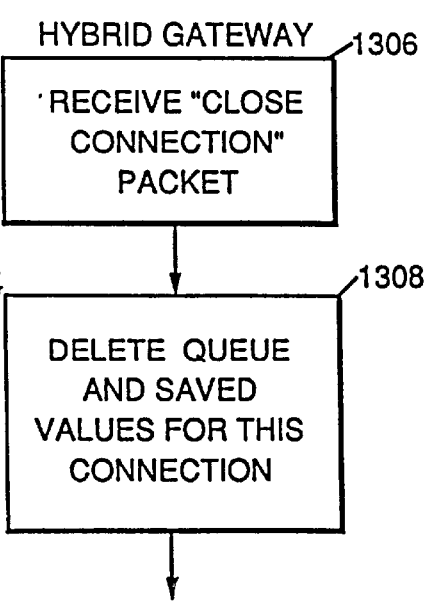
Figure 13C:
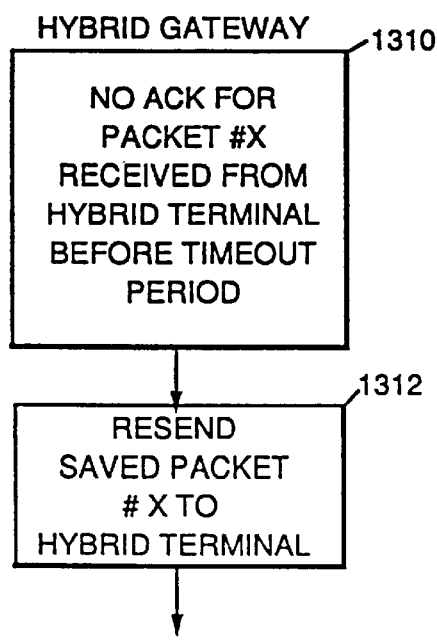
Figure 13E:
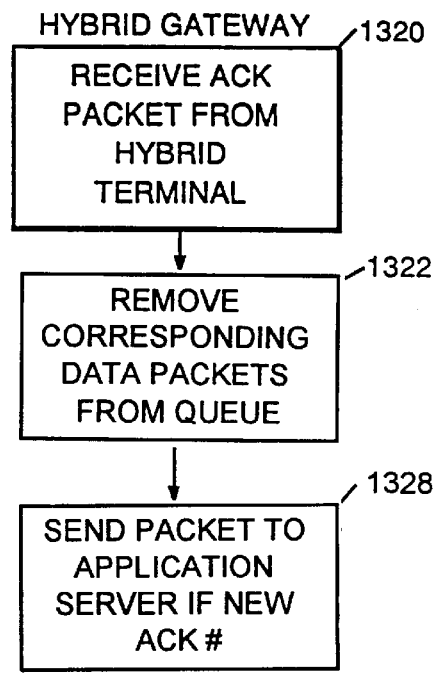
Figure 13D:
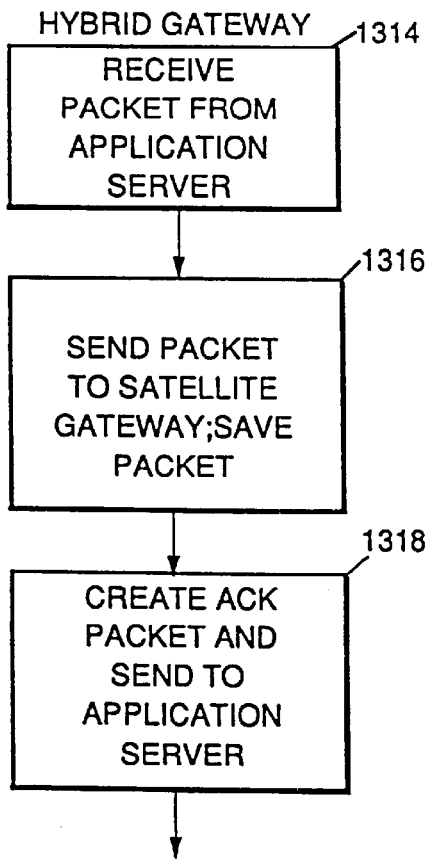

FIG. 12 is a ladder diagram showing packets sent from the application server 140 to the hybrid gateway 150 and from the hybrid gateway 150 to the hybrid terminal 110 through the satellite link. FIG. 12 is not drawn to scale. In FIG. 12, the application server 140 sends a message #1 to the hybrid gateway 150. The propagation time for this transmission is relatively short. The hybrid gateway 150 immediately creates an ACK packet and sends it to the application server 140. The hybrid gateway 150 also sends packet #1 to the hybrid terminal 110 through the satellite link. This transmission has a long propagation delay. When the hybrid terminal 110 receives the packets, it sends an ACK #1 back to the hybrid gateway 150 (e.g., using the tunneling mechanism described above). In a system that does not use tunneling, the hybrid gateway 150 needs to intercept the ACK packet from the hybrid terminal 110.

FIGS. 13(*a*) through 13(*e*) are flowcharts of steps performed by the hybrid gateway 150 of FIG. 1 during protocol spoofing. In step 1302 of FIG. 13(*a*), the hybrid gateway 150 receives a packet from the application server 140 indicating that a new connection is being formed between the application server 140 and the hybrid terminal 110. In step 1304, the hybrid gateway 150 sets up a queue or similar data structure in memory to save un-ACK'ed packets for the new connection. FIG. 13(*b*) shows corresponding steps performed by the hybrid gateway 150 when the connection is closed. The hybrid gateway 150 receives a packet indicating the closure in step 1306 and deletes the queue and saved values for the connection in step 1308.

In step 1310 of FIG. 13(*c*), the hybrid gateway 150 fails to receive an ACK for a packet number X from the hybrid terminal 110 before an end of a predetermined timeout period. The hybrid gateway 150 maintains a timer for each un-ACK'ed packet. At the end of the predetermined period, the hybrid gateway 150 retransmits a packet corresponding to the expired timer. In step 1312, the hybrid gateway 150 resends packet number X, which it previously saved in the memory queue for this connection (see FIG. 13(*d*) below).

In step 1314 of FIG. 13(*d*), the hybrid gateway 150 receives a packet from the application server 140. In step 1316, the hybrid gateway 150 sends the received packet to the satellite gateway 160, where it is transmitted over the satellite link, and saves the packet in case it needs to be retransmitted (see FIG. 13(*c*)). The hybrid gateway 150 then creates an ACK packet to send to the application server 140 in step 1318. The created ACK packet incorporates a format shown in FIG. 11. The hybrid gateway 150 creates an ACK number for field 1104. The ACK number is determined as follows:

The hybrid gateway 150 saves the following information for each connection:

1) Send sequence number—a highest in-sequence number of packets sent by the application server 140 over the connection.

2) ACK sequence number—the ACK sequence number from the most recent packet sent by the hybrid terminal 110 over this connection.

3) ACK window size—the window size from the most recent packet from the hybrid terminal 110 over this connection.

4) ACK number—the ACK sequence number that is relayed to the application server 140. The ACK number is set to: minimum (send sequence number, ACK sequence number+spoofed window size—ACK window size)

5) Spoofed window size—predetermined maximum number window size to be allowed on this connection.

When the hybrid gateway 150 inserts the ACK number in the packet, it also calculates the packet's checksum 1106.

In step 1320 of FIG. 13(*e*), the hybrid gateway 150 receives an ACK packet over the modem link from the hybrid terminal 110. In step 1322, the hybrid gateway 150 removes from the queue the packet for which the ACK was received. Because an ACK was received, the packet does not need to be re-sent. In the TCP/IP protocol, a packet containing an ACK may or may not contain data.

In step 1328, the hybrid gateway 150 forwards the received ACK packet to application server 140. The application server 140 may simply disregard the packet if it contains an ACK and no data. In another embodiment, the hybrid gateway 150 simply discards a packet received from the hybrid terminal 110 that contains an ACK, but no data.

If the connection goes down, either explicitly or after a predetermined period of time, the hybrid gateway 150 deletes the saved packets for the connection.

VII. Summary

In summary, the present invention allows a personal computer to send messages into the Internet using a conventional dial-up link and to download data from the Internet using a high-speed one-way satellite link, which has a variable download rate for each user. In a preferred embodiment, the invention uses a conventional ISP provider to connect to the Internet and uses a commercial software TCP/IP package that has a standard driver interface. The present invention maintains a running average throughput for each user and reduces the user's available bandwidth if the running average throughput exceeds the thresholds defined for the user's service plan. The reduction in throughput is accomplished through a decrease in the TCP window size advertized to the application servers. Additionally, a spoofing protocol compensates for the long propagation delays inherent to satellite communication.

While the present invention is disclosed with respect to a satellite data transfer system, the scope of the invention is not limited thereto. Specifically, the method of the present invention may be used in a conventional terrestrial application, wherein a user places a call to an ISP that makes requests of application servers connected to the internet. The present invention may be implemented at the ISP site to regulate the bandwidth allocated to subscribers. Specifically, the ISP server may alter the advertized window size of the TCP requests from the users. By modifying the advertized window size, the user's bandwidth is reduced because the application server responds at a slower speed related to the reduced advertized window size.

The concept of "throttling," as used herein, may be used by Hughes Network Systems in connection with its DirecPC® product and service to ensure fair access to the appropriate level of system resources contracted for by each subscriber. System resources may include available bandwidth, peak or average data throughput or system response time.

Other embodiments of the invention will be apparent to those skilled in the art from consideration of the specification and practice of the invention disclosed herein. It is intended that the specification and examples be considered as exemplary only, with the true scope of the invention being indicated by the following claims.

What is claimed is:

1. A system comprising:
    a first apparatus configured for coupling to a TCP/IP network;
    a second apparatus configured for coupling to the TCP/IP network via a satellite receiver connected to said second apparatus for receiving data from said first apparatus over the TCP/IP network; and
    a third apparatus configured for coupling to the TCP/IP network for controlling throughput of the data from said first apparatus to said second apparatus,
    wherein said third apparatus automatically controls the throughput in accordance with bandwidth utilization by a user of the second apparatus calculated on a per user basis.

2. A system according to claim 1, wherein said third apparatus automatically controls the throughput in accordance with (a) bandwidth utilization by a user of the second apparatus calculated on a per user basis and (b) a level of service subscribed to by the user.

3. A system according to claim 1, wherein said third apparatus automatically controls the throughput in accordance with (a) bandwidth utilization by a user of the second apparatus calculated on a per user basis and (b) a number of TCP connections opened by the user.

4. A system according to claim 1, wherein said third apparatus automatically controls the throughput in accordance with (a) bandwidth utilization by a user of the second apparatus calculated on a per user basis and (b) load on the satellite link used to send data from said first apparatus to the satellite receiver connected to said second apparatus.

5. A system according to claim 4, wherein the load is measured by measuring latency of data packets awaiting transmission over the satellite link.

6. A system according to claim 1, wherein the bandwidth utilization is measured in units of amount of data per unit time, and said third apparatus automatically controls the throughput in accordance with comparison of the bandwidth utilization to a throughput threshold.

7. A system according to claim 1, wherein said third apparatus effects the throughput control by controlling a window size of a TCP packet.

8. A system according to claim 1, wherein said third apparatus effects the throughput control by discarding packets so as to reduce throughput.

9. A system according to claim 8, wherein the packets are UDP packets.

10. A throughput controlling apparatus for use with a system comprising a first apparatus configured for coupling to a TCP/IP network, a second apparatus configured for coupling to the TCP/IP network via a satellite receiver connected to said second apparatus for receiving data from said first apparatus over the TCP/IP network, and said throughput controlling apparatus,
    wherein said throughput controlling apparatus is configured for coupling to the TCP/IP network for controlling throughput of the data from said first apparatus to said second apparatus, and
    wherein said third apparatus automatically controls the throughput in accordance with bandwidth utilization by a user of the second apparatus calculated on a per user basis.

11. An apparatus according to claim 10, wherein said apparatus effects the throughput control by controlling a window size of a TCP packet.

12. An apparatus according to claim 10, wherein said apparatus effects the throughput control by discarding packets so as to reduce throughput, and
    wherein the packets are UDP packets.

13. A method comprising:
    sending a request to a first device on a TCP/IP network from a second device on a TCP/IP network, wherein the second device on the TCP/IP network is coupled to the TCP/IP network via a satellite receiver connected to the second device;
    sending data from the first device on the TCP/IP network to the second device on the TCP/IP network via the satellite receiver in response to the request;
    automatically controlling, via a third device on the TCP/IP network, bandwidth of the data sent from the first device on the TCP/IP network to the second device on the TCP/IP network via the satellite receiver,
    wherein said controlling is effected in accordance with bandwidth utilization by a user of the second device calculated on a per user basis.

14. A method according to claim 13, wherein said controlling is effected in accordance with the bandwidth utilization and a level of service subscribed to by the user.

15. A method according to claim 13, wherein said controlling is effected in accordance with the bandwidth utilization and a number of TCP connections opened by the user.

* * * * *